United States Patent
Hashimoto et al.

(10) Patent No.: US 6,614,892 B1
(45) Date of Patent: Sep. 2, 2003

(54) DATA COMMUNICATION APPARATUS AND METHOD OF DATA COMMUNICATION

(75) Inventors: Keisuke Hashimoto, Toyokawa (JP); Kenichi Morita, Toyohashi (JP); Kenichi Takahashi, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 299 days.

(21) Appl. No.: 09/620,931

(22) Filed: Jul. 21, 2000

(30) Foreign Application Priority Data

Jul. 28, 1999 (JP) .......................................... 11-213229

(51) Int. Cl.[7] ............................................ H04M 11/00
(52) U.S. Cl. .......................... 379/100.14; 379/100.12; 379/100.17
(58) Field of Search ....................... 379/100.01, 100.14, 379/100.17, 100.12, 100.15, 114.02, 114.01; 358/400, 434

(56) References Cited

U.S. PATENT DOCUMENTS 5,999,598 A * 12/1999 Henrick et al. ........ 379/100.01

FOREIGN PATENT DOCUMENTS

JP 07-095312 A 4/1995
JP 10-145574 A 5/1998

* cited by examiner

*Primary Examiner*—Melur Ramakrishnaiah
(74) *Attorney, Agent, or Firm*—Sidley Austin Brown & Wood LLP

(57) ABSTRACT

A data communication apparatus which first searches a plurality of addresses recorded for an input transmission destination. A communication line is selected which is suited to the set mode. Then, a check is made to determine whether or not the address is present for the set communication line from among the searched plurality of transmission destination addresses, and when the address is not present, the communication line having the next prioritized ranking is set. Then, this series of processes is repeated until the applicable transmission destination is present. The data communication apparatus transmits the data to the destination address when the address of the set communication line is present.

8 Claims, 9 Drawing Sheets

Fig.6

| Transmission mode | Priority ranking 1 | Priority ranking 2 | Priority ranking 3 | Priority ranking 4 |
|---|---|---|---|---|
| Reliable Transmission | ISDN line | Public telephone line | Public telephone + Internet | LAN + Internet |
| High speed Transmission | LAN + Internet | ISDN line | Public telephone + Internet | Public telephone line |
| Normal Transmission | Public telephone line | ISDN line | Public telephone + Internet | LAN + Internet |
| Lowest cost Transmission | LAN + Internet | Public telephone + Internet | Public telephone line | ISDN line |

Fig.7

01-1 : XXX—AAA—BCDE 01-2 : fax@sub.dev.xxx.yyy 01-3 : fax@ppp.dev.ne.xxx 02-1 : YYY—BBB—CDEF 02-2 : fax@sub.dev.yyy.zzz 03-1 : ZZZ—CCC—DEFG 03-2 : fax@sub.dev.zzz.xxx 03-3 : fax@qqq.dev.ne.yyy 03-4 : fax@rrr.dev.aaa.bbb

.   .
.   .
.   .
.   .

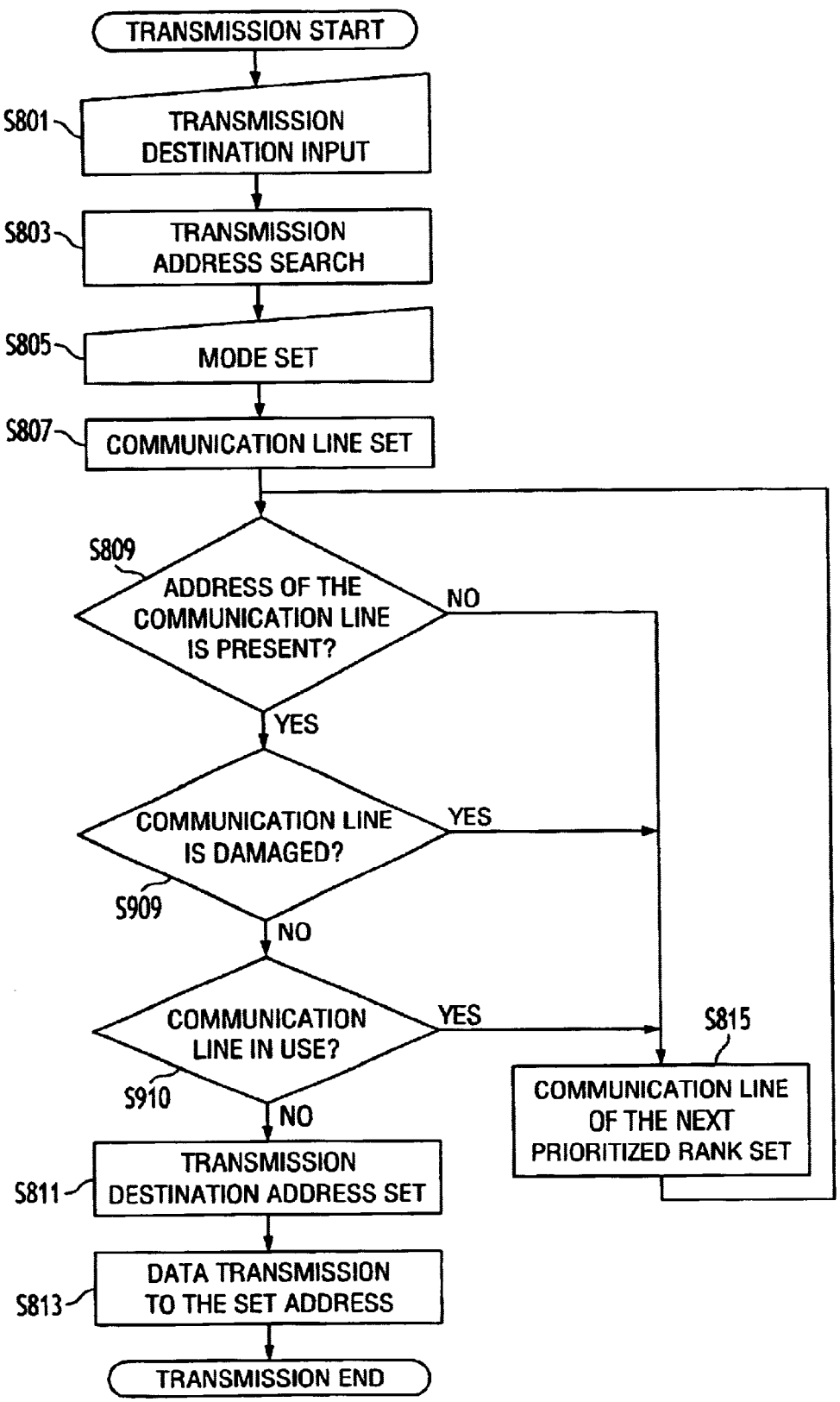

DATA COMMUNICATION APPARATUS AND METHOD OF DATA COMMUNICATION

This application is based on Patent Application No. 11-213229 filed in Japan, the content of which is hereby incorporated by reference.

BACKGROUND OF THE INVENTION

1. Field of the Invention

The present invention relates to a data communication apparatus, and specifically relates to a data communication apparatus and method of data communication capable of communicating data over a plurality of communication lines.

2. Description of the Related Art

Data communications apparatuses capable of using multiple lines including not only public telephone lines, but also internet lines and LAN lines have become increasing popularized in recent years through the equipping of the communication infrastructure. A representative example of a data communication apparatus is the internet facsimile device. Data communication apparatuses capable of using multiple lines must select the line to use for data transmission when such data are to be transmitted.

Art for selecting a transmission line is disclosed, for example, in Japanese Laid-Open Patent Application No. 7-95312, which describes art for selecting the least expensive line for transmission from among a plurality of lines. Furthermore, Japanese-Laid-Open Patent Application No. 10-145574 discloses art for sequentially trying to connect a line having the least expensive communication charge.

According to the disclosed art, the communication cost is reduced without requiring the user to select the line by automatically selecting the least expensive line from among a plurality of lines based only on input of a transmission destination.

In general, in data communication apparatuses such as facsimile devices and the like, a user may set various types of modes when transmitting a document image. Modes include, for example, document classification (color or black-and-white, photograph or text), read mode (resolution priority, or halftone priority, or reading resolution (dpi)), transmission mode (security priority, communication cost priority, reliability priority, or high-speed priority) and the like.

Accordingly, when multiple lines are usable, there is the presumption of an available optimum line corresponding to each mode due to the presence of advantages and disadvantages of data communication inherent in each line.

In data communication apparatuses such as facsimile devices and the like of the conventional art, consideration is only given to the incurred fee regardless of the set mode, such that the least expensive communication line is usually selected. For this reason, the data transmission does not sufficiently reflect the intent of the user as indicated by the set mode.

SUMMARY OF THE INVENTION

An object of the present invention is to provide a data communication apparatus having excellent operability which adequately reflects a users intention, by selecting an optimum communication line corresponding to a set mode.

These objects are attained by providing a data communication apparatus of the present invention comprising: a mode setting unit for setting mode related to data communication; selection unit for selecting a line to use for data communication from among a plurality of lines in accordance with a mode set by the mode setting unit; an input unit for inputting a transmission destination; a memory unit for storing a plurality of addresses of a transmission destination; and an acquisition unit for acquiring an address from the memory unit corresponding to a line selected by the selection unit based on the transmission destination input by the input unit.

These objects are further attained by a method of data communication of the present invention comprising the steps of: setting a mode related to data communication; selecting a line to use for data communication from among a plurality of lines in accordance with the set mode; inputting a transmission destination; and acquiring an address from the memory unit storing a plurality of addresses of transmission destinations in accordance with the selected line based on an input transmission destination.

The present invention provides a data communication apparatus and method of data communication having excellent operability adequately reflecting a users intention because an optimum communication line is selected in accordance with the mode setting.

In the following description, like parts are designated by like reference numbers throughout the several drawings.

BRIEF DESCRIPTION OF THE DRAWINGS

FIG. 6 shows an example of a prioritized ranking corresponding to transmission mode determined by the prioritized ranking determination unit 503;

FIG. 7 shows an example record of transmission destination addresses stored in the address memory 411;

FIG. 9 is a flow chart showing the added process of determining line condition in the flow chart of FIG. 8.

DETAILED DESCRIPTION OF THE PREFERRED EMBODIMENT

Figure 1:
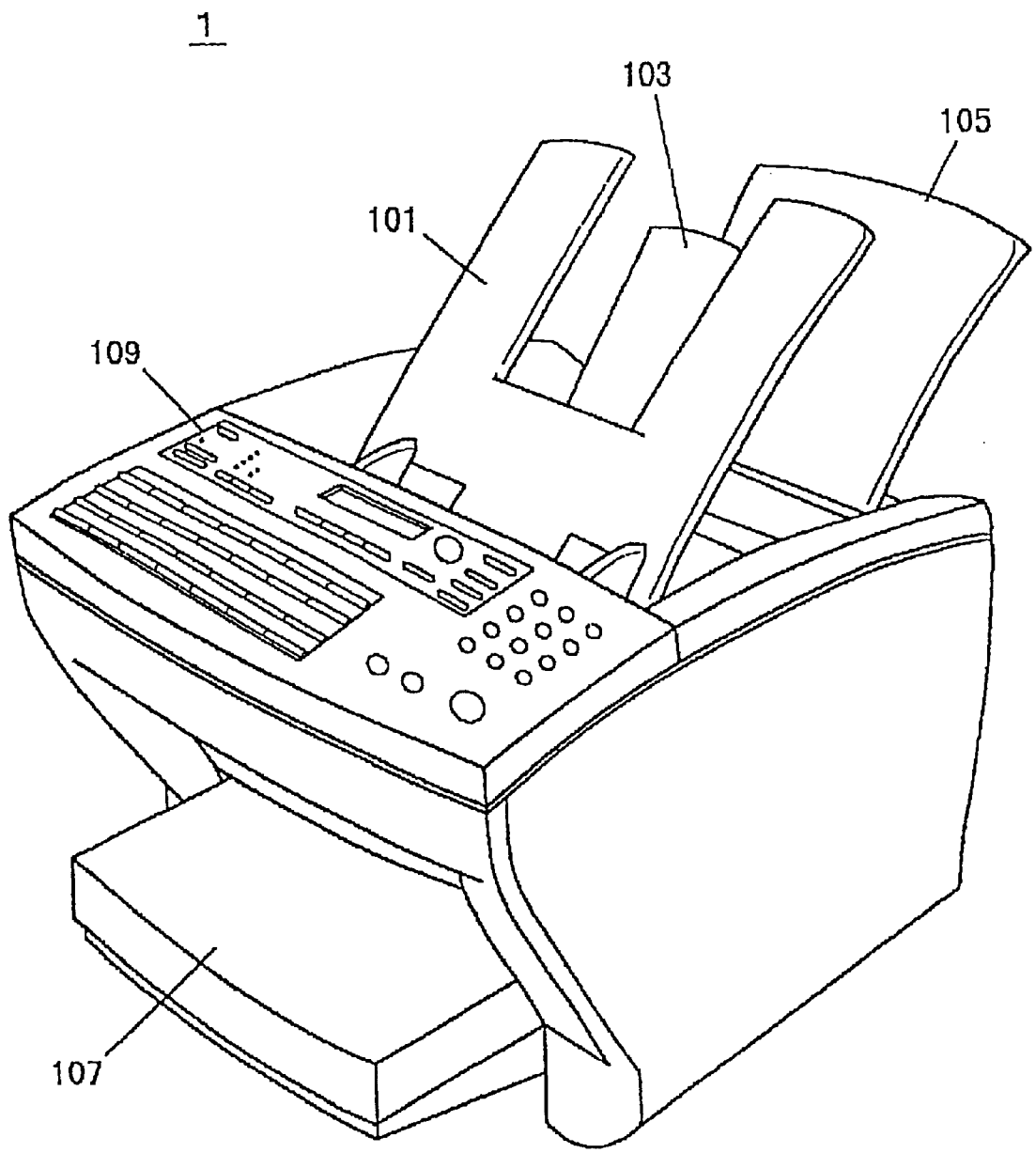
FIG. 1 shows an exterior view of a data communication apparatus 1 of an embodiment of the present invention.

The embodiments of the present invention are described hereinafter with reference to the accompanying drawings. FIG. 1 shows an exterior view of a data communication apparatus 1 of an embodiment of the present invention. Referring to FIG. 1, the data communication apparatus 1 comprises a document feed tray 101 for supplying a document image for use in transmission, a document discharge tray 103 for discharging read document images, recording sheets feed tray 107 for supplying recording sheets for printing received data, recording sheets discharge tray 105 for discharging printed recording sheets, and an operation panel 109 for operating the data communication apparatus 1.

Figure 2:
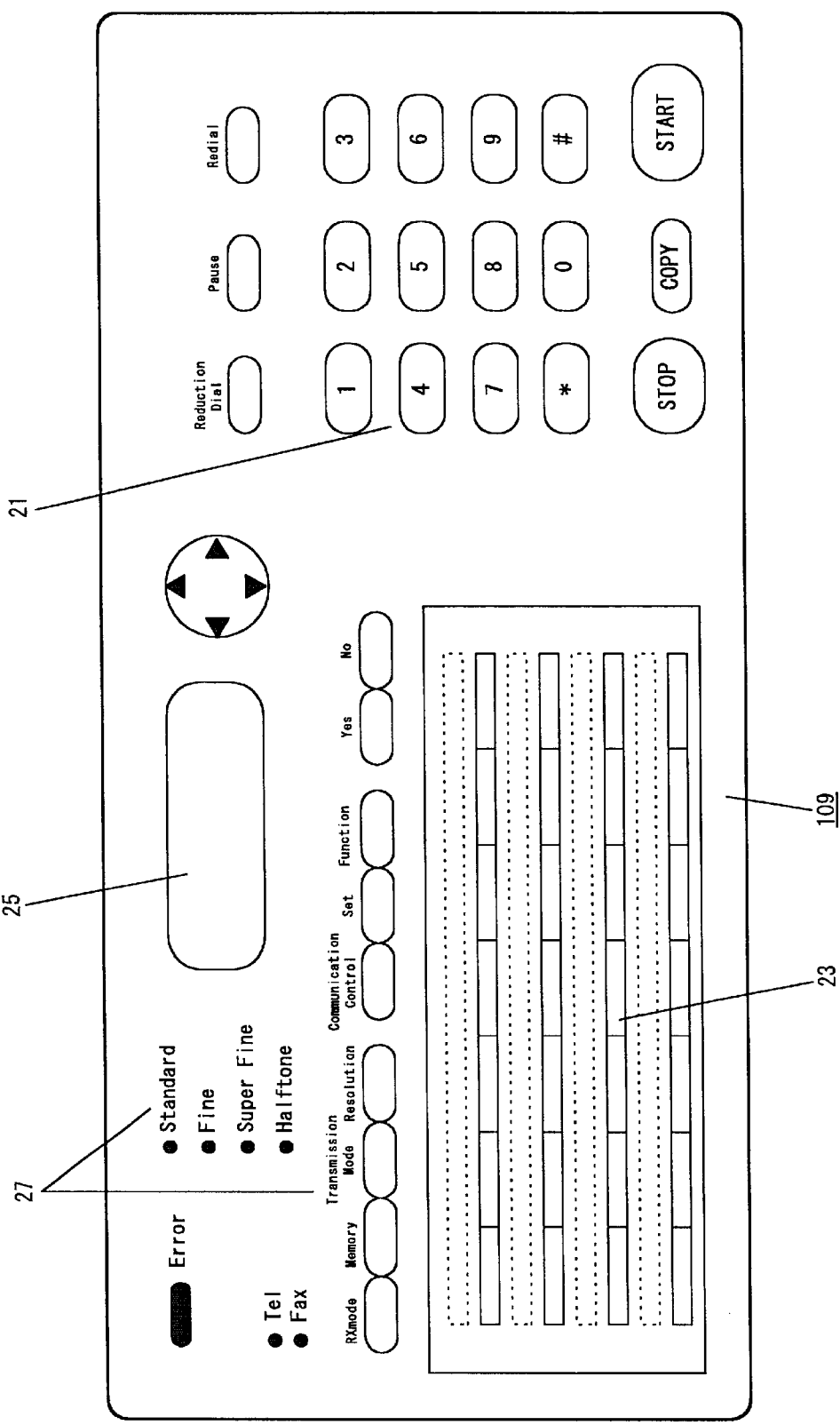
FIG. 2 is a top view of the operation panel 109 of FIG. 1.

FIG. 2 shows a top view of the operation panel 109. The operation panel 109 includes a ten-key pad 21 for transmission destination input, and recording fax numbers and mail addresses and the like, a one-touch dial key 23 for recording fax numbers and mail addresses and the like, a display unit 25 for displaying messages and the like to the user, and a mode setting keys 27 for setting transmission mode, resolution and the like.

Figure 3:
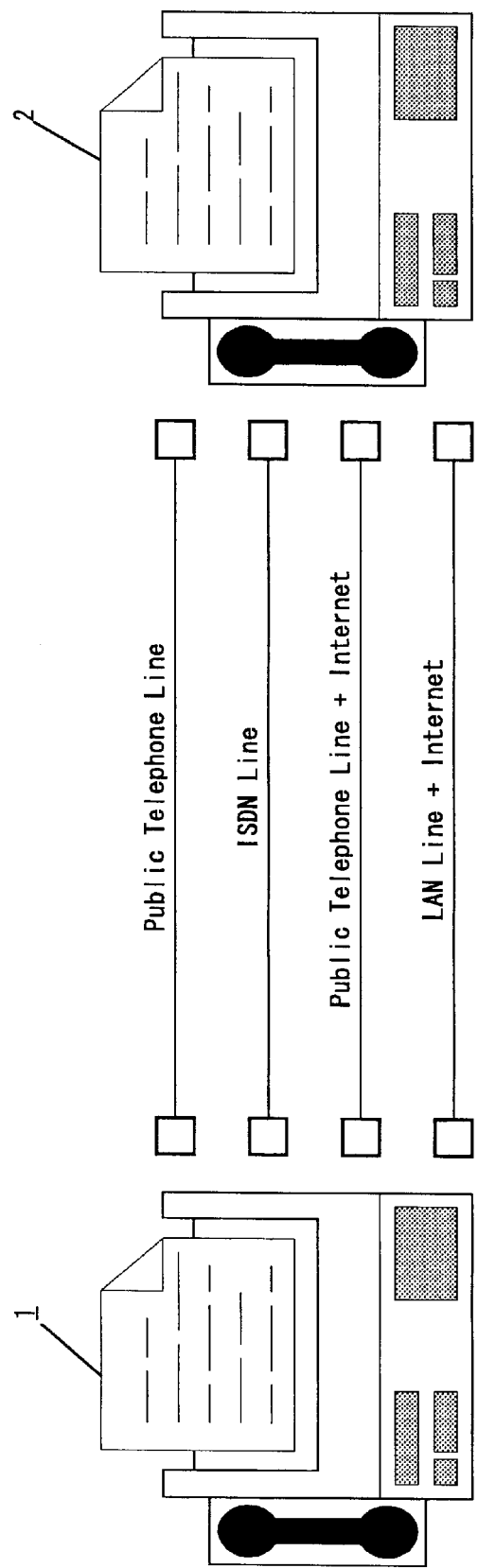
FIG. 3 shows an example of a usable connections of the data communication apparatus 1 of an embodiment of the present invention.

FIG. 3 shows an example of usable connections by the data communication apparatus 1 of an embodiment of the present invention. A data communication apparatus 1 and a data communication apparatus 2 can accomplished data transmission via four types of communication lines, i.e., public telephone line, ISDN line, public telephone line and internet, and LAN line and internet. One of the four types of communication lines is selected from among the four types of communications lines based on the mode set by the user.

Figure 4:
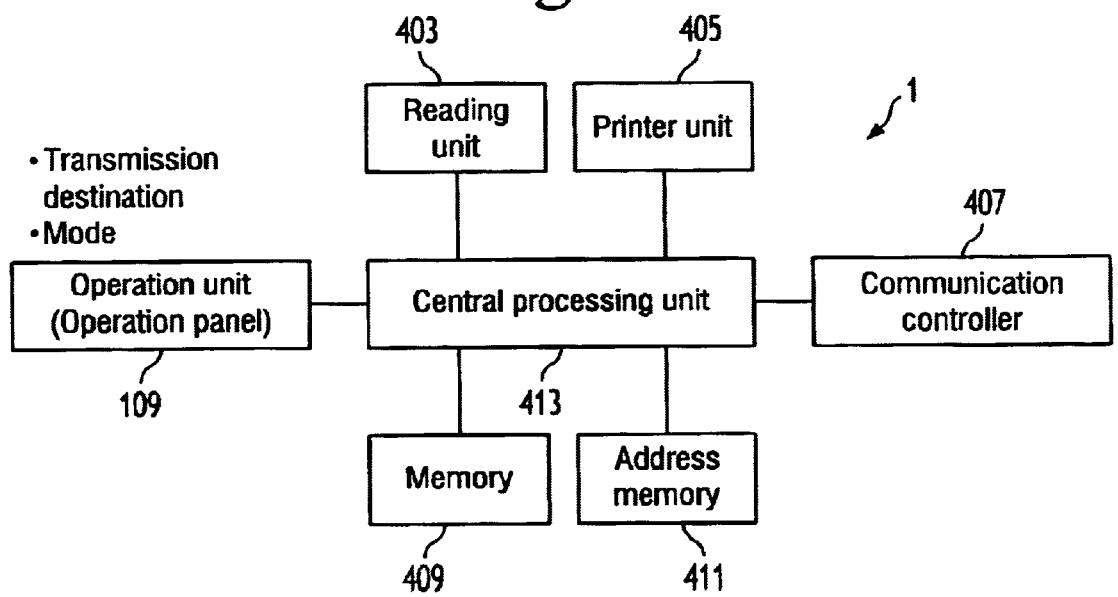
FIG. 4 is a block diagram briefly showing the overall construction of the data communication apparatus 1 of an embodiment of the present invention.

FIG. 4 is a block diagram briefly showing the overall construction of the data communication apparatus 1 of an embodiment of the present invention. A central processing unit 413 controls the overall apparatus. The operation unit (operation panel) 109 is used to specify and record the transmission destination, and set the various modes. A reading unit 403 reads a document image at a specified resolution. A communication controller 407 transmits data read via the reading unit 403, and receives data. A printer unit 405 outputs data received by the communication controller 407 at a specified resolution. An address memory 411 stores transmission destination addresses (internet address, fax number and the like) recorded by the one-touch dial key 23. A memory 409 stores received data and control programs and is used as a work area by the central processing unit 413.

Figure 5:
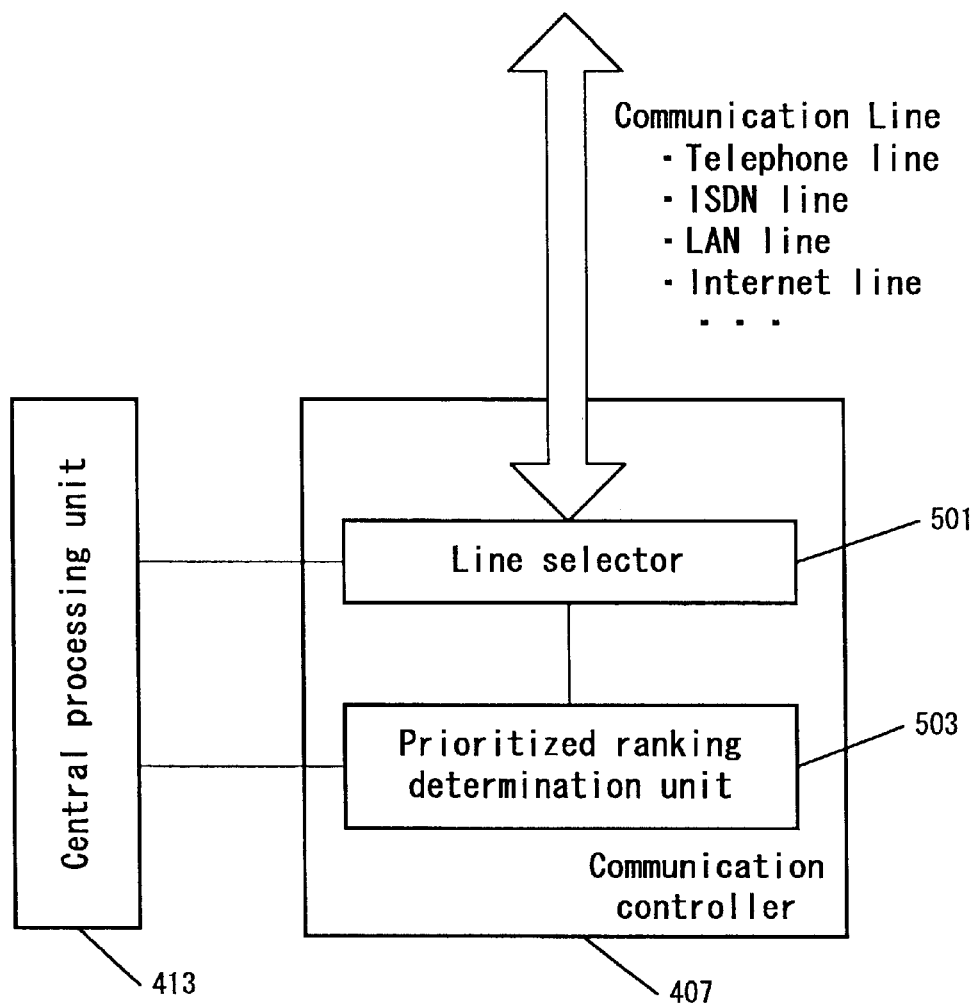
FIG. 5 shows an example of a data table associating telephone numbers and fax numbers to internet addresses, and the data table is stored in a reply destination memory 211 of FIG. 2.

The communication controller 407 is connected to a plurality of communication lines, and transmits and receives data using a line best suited to the situation. FIG. 5 shows a block diagram illustrating the operation of the communication controller 407. The communication controller 407 has a prioritized ranking determination unit 503 for prioritizing the ranking of a plurality of communication lines by receiving mode setting information transmitted from the central processing unit 413. The communication controller 407 further has a line selector 501 for selecting the line to actually be used based on the determination result of the prioritized ranking determination unit 503.

FIG. 6 shows an example of a prioritized ranking corresponding to the communication mode. For example, a user may set the reliable transmission mode as the transmission mode from the operation panel 109. At this time, the prioritized ranking determination unit 503 sets the sequential priority ranking from the highest possible reliable transmission from among the plurality of communication lines. In FIG. 6, the four priority ranking are determined in the sequence of [ISDN line], [public telephone line], [public telephone line and internet line], [LAN line and internet line].

Accordingly, the line selector 501 first tries data transmission using the [ISDN line] having the prioritized rank 1. However, when the communication line having the prioritized rank 1 is, for example, currently being used, or when the transmission destination address corresponding to this line is not present in the address memory 411, then the line selector 501 tries data transmission using the communication line [public telephone line] having the prioritized rank 2. When the communication line having the prioritized rank 2 cannot be used, the line selector 501 uses the communication line [public telephone line and internet line] having the prioritized rank 3. In this manner the line selector 501 tries to use the lines sequentially from the line having the highest prioritized rank.

FIG. 7 shows an example of a record transmission destination addresses stored in the address memory 411. In FIG. 7, the numerals "01–1" to "01–3" on the left side are addresses of the same transmission destination recorded at "01" of the one-touch dial key 23. A plurality of addresses may be recorded for the same transmission destination of the one-touch dial key 23 corresponding to a plurality of numerals ("01","02" and "03") on the left side.

All transmission destinations are not limited to having the addresses corresponding to all communication lines connected to the data communication apparatus 1. That is, a different number of addresses may be recorded at each one-touch dial key 23 (transmission destination). For example, three addresses are recorded at "01" of the one-touch dial key 23, two addresses are recorded at "02", and four addresses are recorded at "03".

Figure 8:
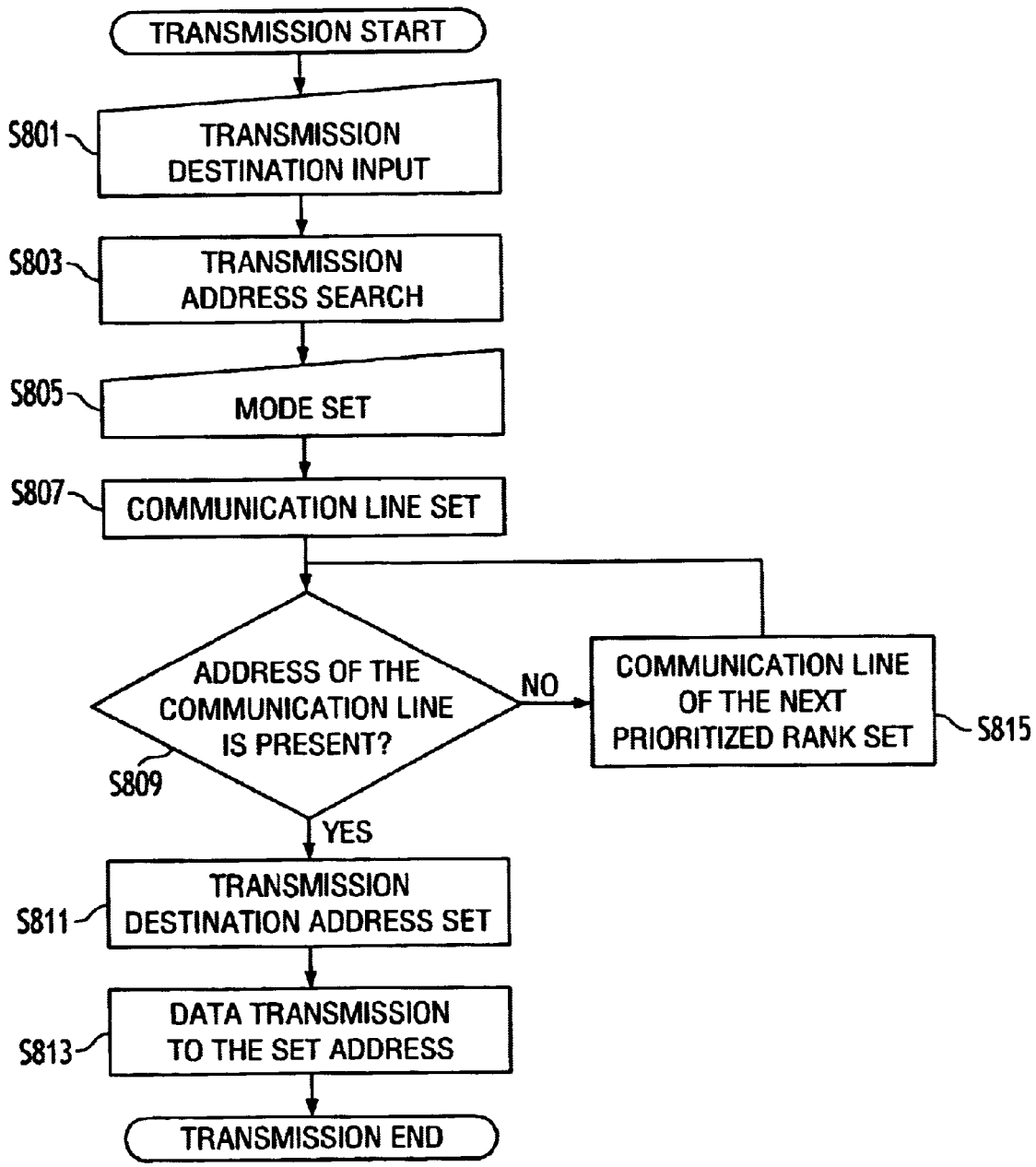
FIG. 8 is a flow chart of the flow of the transmission operation of the data communication apparatus 1 of an embodiment of the present invention.

FIG. 8 is a flow chart of the flow of the transmission operation of the data communication apparatus 1 of an embodiment of the present invention. Referring to FIG. 8, first, in step S801, the data communication apparatus 1 has transmission destination input from the operation panel 109 via the user. Then, in step S803, a plurality of addresses recorded for the input transmission destination are searched from the address memory 411.

Next, in step S805, the user sets the mode from the operation panel 109. In step S807, the communication controller 407 sets a communication line suited for the set mode.

Then, in step S809, a check is made to determine whether or not the address of the communication line set in step S807 is present among the plurality of addresses of transmission destinations searched in step S803.

When the applicable address is not present, the routine continues to step S815, and the communication line of the next prioritized rank suited for the set mode is set. Then, the routine returns to the process of step S809, and the presence/absence of the newly set communication line address is confirmed. This series of processes is repeated until the applicable transmission destination address is present (steps S809, S815).

On the other hand, when the address of the communication line set in step S807 is present in step S809, the routine continues to step S811. In step S811, the transmission destination address which is present is suited to the set mode, and determined as the address to use for actual transmission.

In step S813, data are transmitted to the transmission destination address set in step S811 over the final set communication line.

The flow of the previously described process is described specifically with reference to FIGS. 7 and 8. First, a user specifies, for example, [Development Department 2] as the transmission destination (step S801). When the transmission destination is set, the three addresses of "XXX-AAA-BCDE", "fax@sub.dev.xxx.yyy" and "fax@ppp.dev.ne.xxx" previously recorded at "01" of the one-touch dial key 23 are obtained as a search result for [Development Department 2] (step S803).

Then, the transmission mode is set from the touch panel 109 (step S805). At this point assume that a large amount of data are to be transmitted, and reliability and security are not required; it is assumed the user would consider high speed transmission. Accordingly, the user sets the [high speed transmission mode]. When the [high speed transmission mode] is set, the line selector 501 sets the [LAN line and internet line] communication line having the highest prioritized rank suited for the high speed transmission mode (step S807) (refer to FIG. 6).

When the address of the transmission destination corresponding to the set communication line is the address "fax@sub.dev.xxx.yyy" from among the three previously obtained addresses, the address "fax@sub.dev.xxx.yyy" is set as the as the transmission address (step S809, S811). When the address corresponding to the communication line is not present, the applicable addresses are sequentially searched from the communication line having the highest prioritized rank until the address is present (steps S815, S809).

Then, the data are transmitted to the set address "fax@sub.dev.xxx.yyy" over the [LAN line and internet line] communication line corresponding to the address.

As described above, the data communication apparatus 1 of an embodiment of the present invention selects an optimum communication line corresponding to a user set mode. As a result, the intention of the user is accurately reflected. Accordingly, a data communication apparatus having excellent operability is provided which can avoid situations such as normally using the communication line having the lowest cost regardless of the set mode.

In the flow chart of FIG. 8, only the presence/absence of a transmission address corresponding to a communication line has been considered to set a communication line suited for a set mode (step S809). However, the present invention is not limited to this arrangement, inasmuch as, for example, line conditions may be considered such as whether or not a line is damaged (step S909), and whether or not a line is currently in use (step S910), as shown in FIG. 9.

An appropriate communication line can be selected and data can be transmitted reliably and suitably by adding the aforesaid determinations.

In the data communication apparatus 1 of an embodiment of the present invention only the transmission mode is considered as the set mode. However, the present invention is not limited to this arrangement inasmuch as, other mode settings may be considered including, for example, document classification mode, reading image mode and the like. Furthermore, and optimum communication line may be selected when a plurality of mode settings are combined. In this way, the intention of the user can be finely reflected.

In FIG. 6, four types of transmission mode are offered. However, the present invention is not limited to this arrangement, inasmuch as fewer than four modes, or more than four modes adding [secure transmission] and the like may be used. Furthermore, the communication lines used are not restricted to the four types of communication lines shown in FIG. 3.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A data communication apparatus comprising:

a mode setting unit for setting a-mode related to data communication;

a selection unit for selecting a line to use for data communication from among a plurality of lines in accordance with a mode set by the mode setting unit;

an input unit for inputting a transmission destination of data;

a memory unit for storing a plurality of addresses of a transmission destination; and an acquisition unit for acquiring an address from the memory unit corresponding to a line selected by the selection unit based on the transmission destination input by the input unit.

2. The data communication apparatus according to claim 1, further comprising a data transmission unit for transmitting a data to the acquired address.

3. The data communication apparatus according to claim 1, further comprising a ranking determining unit for determining priority ranking of a plurality of lines in accordance with a set mode.

4. The data communication apparatus according to claim 3, wherein said selection unit selects a line to use for data communication based on the priority ranking set by said ranking determining unit.

5. A method of data communication comprising the steps of:

setting a mode related to data communication;

selecting a line to use for data communication from among a plurality of lines in accordance with the set mode;

inputting a transmission destination; and acquiring an address from the memory unit storing a plurality of addresses of transmission destinations in accordance with the selected line based on the input transmission destination.

6. The method according to claim 5, further comprising the step of:

transmitting a data to the acquired address.

7. The method according to claim 5, further comprising the step of:

determining a priority ranking of a plurality of lines in accordance with a set mode.

8. The method according to claim 7, wherein said selecting step selects a line to use for data communication based on the priority ranking determined.

* * * * *